hold down tubes towards said abutment surface so that the wheel rim is captivated between said hold down tubes and said abutment surface to locate the wheel rim with the lug hole circle thereof concentric of said central axis of said base assembly.

2. The system of claim 1 wherein said adapter unit further includes indicator means for indicating the radial distance between each of said locating pins and said central axis so that all of said locating pins can be located equidistant from said central axis, said system further including gaging means independent of said adapter unit for measuring the distance between adjacent lug holes in the wheel rim, said gaging means including readout means for indicating the radial distance between the lug holes on the wheel rim and the effective axis of rotation of the tire assembly so that said adapter unit can be preadjusted to mount the wheel rim by manipulation of said adjustment means until said indicator means shows that said locating pins are spaced the same radial distance from said central axis of said adapter unit as said readout means on said gaging unit indicates the lug holes are located from the effective axis of rotation of the tire assembly.

3. The system of claim 1 further including locating means for selectively locating each of said slide members at predetermined positions along the length of said slot mounting said slide member so as to locate said locating pin mounted on said slide member at predetermined radial distances from said central axis of said base assembly.

4. The system of claim 3 wherein said locating means includes a plurality of sets of notches defined in said base assembly along said slots, with one of said sets of notches along each of said slots, said notches of each of said sets located at different predetermined radial distances from said central axis of said base assembly and each of said notches in each set located at the same predetermined radial distance from said central axis as one of said notches in each of said other sets; and slide detent means mounted on each of said slide members resiliently engaging said notches in said set along said slot slidably carrying said slide member to locate said slide member at predetermined positions along said slot so that, when said slide detent means in each of said slide members engages the corresponding notch in each of said sets of notches, all of said locating pins will be located equidistant from said central axis of said base assembly.

5. The system of claim 4 wherein said attachment section on each of said locating pins has a projecting end thereon adapted to bear against said base assembly at said slot, wherein said base assembly defines a plurality of sets of depressions therein opening into said slots with one of said sets of depressions along each of said slots and with each of said depressions in each of said sets located in registration with said radial path along said slot, said depressions in each set corresponding in number to the number of notches in said set of notches along said slot with each of said depressions located a common prescribed radial distance from a different one of said notches equal to the distance between said detent means and the hole axis in said slide member; and wherein said locating pin includes pin detent means centrally located on the projecting end of said attachment section in registration with the axis of said locating pin so that, when said attachment section on said locating pin is screwed into said hole through said slide member, said pin detent means will engage said depression in said base assembly in registration with said hole in said slide member to locate the axis of said locating pin in registration with said radial path along said slot.

6. The system of claim 4 further including adjustment indicia associated with said notches in each of said sets of notches where the adjustment indicia associated with each of said notches in each of said sets is common to the adjustment indicia associated with the corresponding of said notches in each of said other sets located at the same predetermined radial distance from said central axis of said base assembly as said firse mentioned notch.

7. The system of claim 6 further including gaging means for measuring the distance between adjacent lug holes in the wheel rim, said gaging means including readout means for indicating the radial distance between the lug holes in the wheel rim and the effective axis of rotation of the tire assembly, said readout means having measuring indicia thereon corresponding to the adjustment indicia on said adapter unit so that, by moving said slide members until said slide detent means engages that one of said notches having the same adjustment indicia as the measuring indicia indicated on said gaging unit, said locating pins will be located the same radial distance from said central axis of said base assembly as the lug holes are spaced from the effective axis of rotation of the tire assembly whereby the effective axis of rotation of the tire assembly will coincide with the central axis of said base assembly when the tire assembly is mounted on said adapter unit.

8. The system of claim 1 wherein said attachment section on each of said locating pins has a projecting end thereon adapted to bear against said base assembly at said slot, wherein said base assembly defines a plurality of sets of depressions therein opening into said slots with one of said sets of depressions along each of said slots and with each of said depressions in each of said sets located in registration with said radial path along said slot, said depressions in each set corresponding in number to the number of notches in said set of notches along said slot with each of said depressions located a common prescribed radial distance from a different one of said notches equal to the distance between said detent means and the hole axis in said slide member; and wherein said locating pin includes pin detent means centrally located on the projecting end of said attachment section in registration with the axis of said locating pin so that, when said attachment section on said locating pin is screwed into said hole through said slide member, said pin detent means will engage said depression in said base assembly in registration with said hole in said slide member to locate the axis of said locating pin in registration with said radial path along said slot.

* * * * *

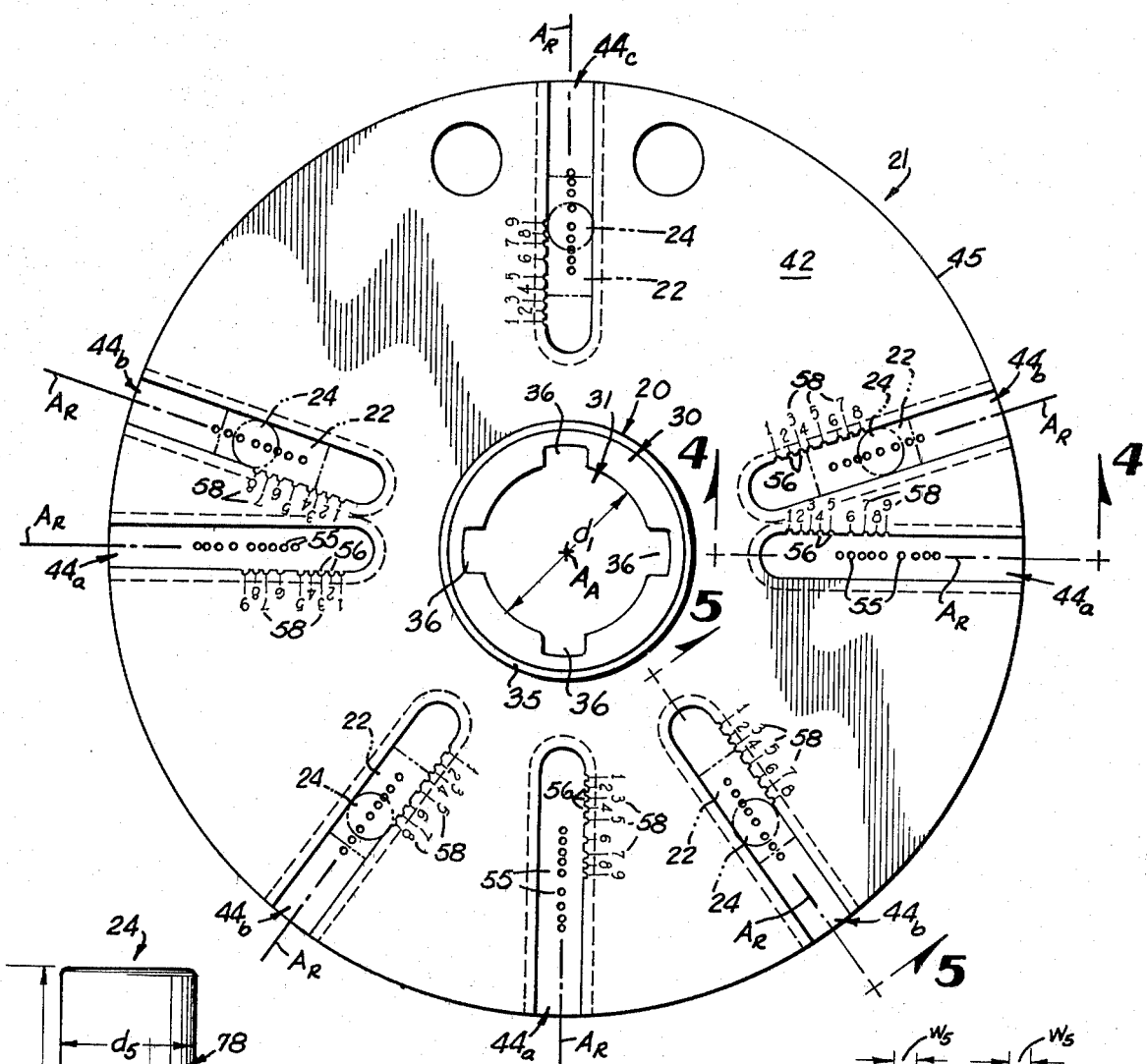
FIG 3
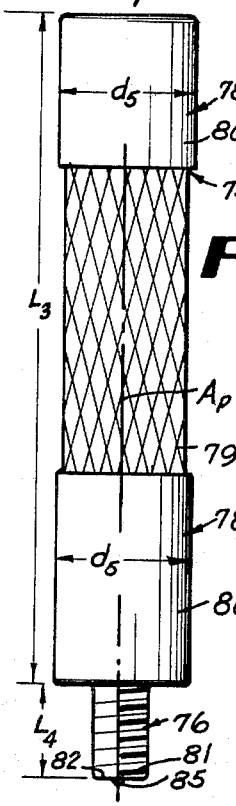
FIG 7
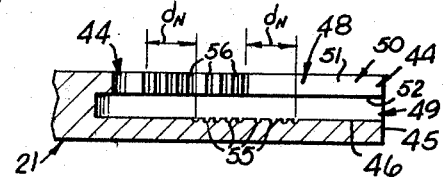
FIG 4
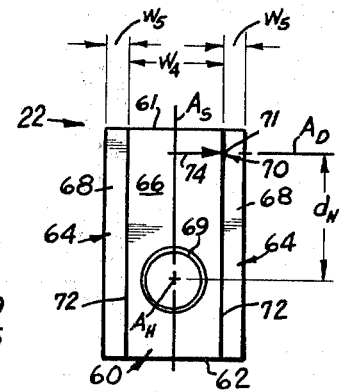
FIG 6
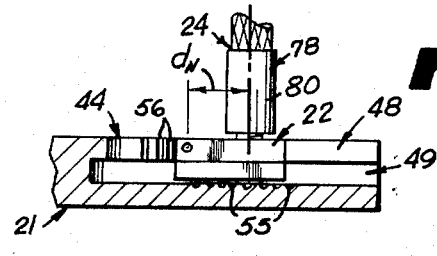
FIG 5
FIG 8

4,381,671

TIRE MOUNTING SYSTEM

BACKGROUND OF THE INVENTION

This invention is directed generally to mounting systems for mounting tire assemblies on tire testing and correcting apparatus and more particularly to an adapter which is adjustable to mount different tire assemblies on the drive spindle of tire testing and correcting apparatus.

It is frequently necessary to mount tire assemblies including a pneumatic tire mounted on a vehicular wheel rim on the drive spindle of tire testing and correcting apparatus. Examples of such tire testing and correcting apparatus are wheel balancers and force variation tire grinding machines such as disclosed in my co-pending application Ser. No. 201,526. In order to properly test and correct a tire assembly with testing and correcting apparatus, it is necessary to locate the tire assembly on the drive spindle of the apparatus so that the effective rotational axis of the tire assembly coincides with the rotational axis of the drive spindle on the testing and correcting apparatus. The tire assemblies are typically located on the drive spindle of the testing and correcting apparatus using either the central opening through the wheel rim or by using the lug holes through the wheel rim. Most of the prior art adapters for mounting tire assemblies on the drive spindles of these testing and correcting apparatus require that the tire assembly be mounted on the adapter while the adapter is mounted on the drive spindle of the testing and correcting apparatus. This makes it difficult to easily and expeditiously mount the tire assembly.

Mounting adapters using the lug holes in the wheel rim to locate the tire assembly need to be able to compensate for different lug hole circle diameters encountered on different tire assemblies as well as be able to accommodate the different number of lug holes in different wheel rims. Some attempts have been made to accommodate these variances in lug hole circle diameters and number of lug holes as is illustrated in U.S. Pat. No. 3,583,238. The adapter illustrated in that patent seeks to provide a means by which the tire assembly can be located on the adapter while the adapter is removed from the drive spindle of the testing and correcting machine. To compensate for different lug hole circle diameters and different numbers of lug holes in the tire assembly, a series of holes are provided in a mounting plate through which support pins are inserted to locate the wheel rim. One of the major problems with the adapter illustrated in that patent is that it is difficult and time consuming to align the lug holes in the wheel rim with the correct holes in the mounting plate to insure that the effective axis of rotation of the tire assembly coincides with the axis of the mounting plate.

SUMMARY OF THE INVENTION

These and other problems and disadvantages associated with the prior art are overcome by the invention disclosed herein by providing a mounting adapter which is adjustable to accommodate different lug hole circle diameters as well as different numbers of lug holes in the wheel rim and on which the tire assembly can be mounted while the mounting adapter is removed from the drive spindle of the testing and correcting apparatus. The mounting adapter of the invention can be preadjusted to accept the lug holes in the wheel rim of the tire assembly prior to positioning the tire assembly thereon so that no further adjustment or manipulation of the wheel rim is required after placement on the mounting adapter. The invention also includes a gaging unit which permits the lug hole circle diameter in the wheel rim to be predetermined for preadjusting the mounting adapter to accept the wheel rim thereon. The mounting adapter includes a plurality of locating pins thereon which are slidably adjustable about radially extending paths on the mounting adapter so that, when the locating pins are preadjusted to locations corresponding to the lug holes in the wheel rim, the wheel rim can be placed over the locating pins without excessive manipulation of the wheel rim as is required by the prior art.

The mounting adapter of the invention includes a base assembly defining a central passage therethrough which is sized to be slidably received over the drive spindle of the tire testing and correcting apparatus with the base assembly defining an abutment surface thereon oriented normal to the central axis of the central passage in the base assembly. A plurality of elongate locating pins corresponding in number to the lug holes through the wheel rim are adjustably positioned on the base assembly by adjusting means so that the locating pins project from the abutment surface parallel to the central axis of the central passage throug the base assembly and are located about a circular path concentrically of the central axis of the base assembly so that the locating pins will project through the lug holes in the wheel where the adjustment means adjustably positions each of the locating pins along an adjustment path extending radially of the central axis of the base assembly so that the locating pins can be adjusted for different lug hole circle diameters in wheel rims. After the wheel rim has been positioned on the base assembly so that the locating pins project through the lug holes, a plurality of hold down tubes corresponding in number to the locating pins are slipped over the locating pins on the opposite side of the wheel rim from the abutment surface on the base assembly. Each of the hold down tubes has a tapered locating surface on the end thereof adapted to engage the wheel rim about the lug hole through which the locating pins project to locate the lug holes concentrically of the locating pins. A hold down member is provided for engaging the ends of the hold down tubes opposite the tapered locating surfaces thereon and a locking member is provided which threadedly engages the base assembly to force the hold down tubes toward the abutment surface on the base assembly to captivate the wheel rim between the hold down tubes and the abutment surface on the base assembly to locate the wheel rim with the lug hole circle concentric of the central axis of the base assembly.

The adjustment means includes a plurality of slots defined in the base assembly and slide members slidably mounted in the slots for movement along the length of the slots where each of the slide members carries one of the locating pins to permit the adjustment of the radial distance between the locating pin and the central axis of the base assembly. These slots are provided with notches where corresponding notches at each of the slots are located the same radial distance from the central axis of the base assembly and a detent assembly is mounted in each of the slide members so that, when the detent assembly in the slide members engages the corresponding notches adjacent the slots carrying the slide members, all of the locating pins carried by the slide members will be located at the same radial distance from the central axis of the base assembly.

The gaging unit includes a pair of arms pivoted with respect to each other and mounting measuring pins on one end of the arms. When the measuring pins are placed in adjacent lug holes on the wheel rim, the opposite ends of the arms provide an indication of which of the notches in the mounting adapter at which the slide members are to be set to locate the locating pins at the same radial distance from the central axis of the adapter as the lug holes are located from the effective axis of rotation of the tire assembly.

These and other features and advantages of the invention will become more apparent upon consideration of the following detailed description and accompanying drawings wherein like characters of reference designate corresponding parts throughout the several views and in which:

BRIEF DESCRIPTION OF THE DRAWINGS

FIG. 3 is an enlarged end view of the adapter unit of the invention partly assembled;

FIG. 4 is a cross-sectional view taken generally along line 4—4 in FIG. 3;

FIG. 5 is a cross-sectional view taken generally along line 5—5 in FIG. 3;

FIG. 6 is an enlarged top plan view of the slide member of the adapter unit;

FIG. 7 is an enlarged side elevational view of the locating pin of the adapter unit;

FIG. 8 is an enlarged view shown partly in cross-section of the attachment section of the locating pin of the adapter unit;

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 12:
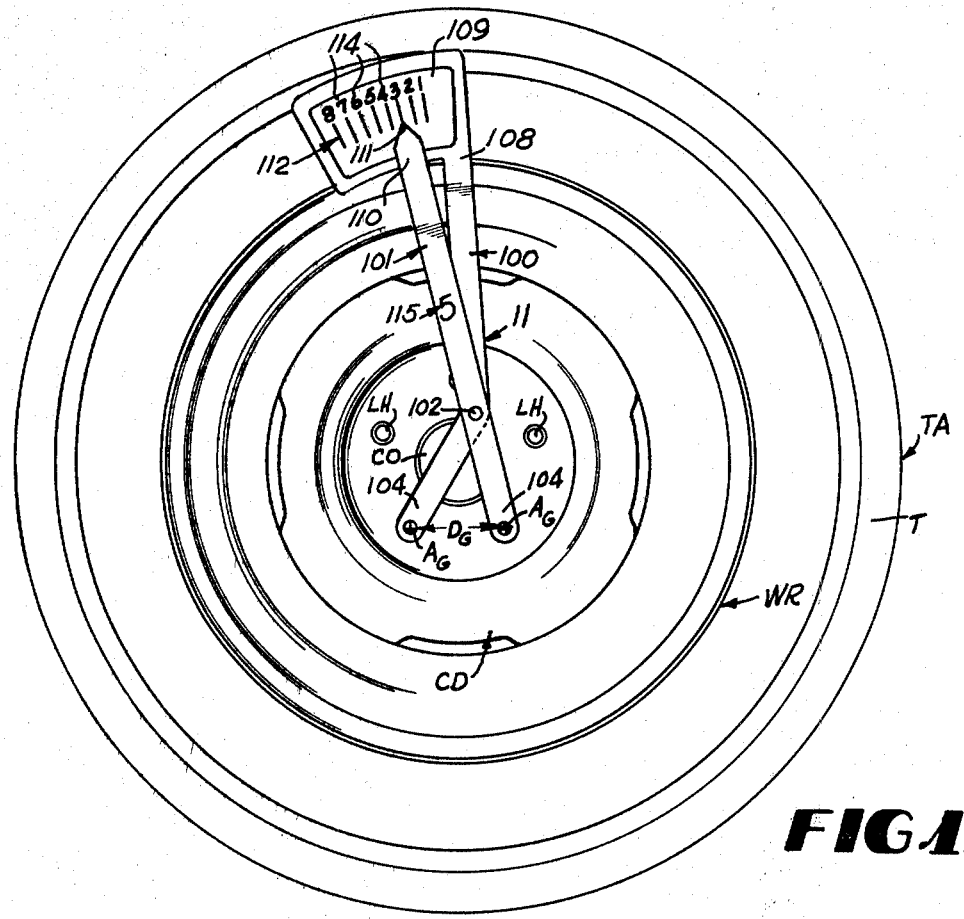
FIG. 12 is a drawing illustrating the gaging unit of the invention being used.

Referring to the drawings, it will be seen that the system of the invention is used to mount a tire assembly TA seen in FIG. 12 on the mounting spindle of a tire testing and correcting apparatus. The tire assembly TA has a wheel rim WR mounting an inflated pneumatic tire T thereon. The wheel rim WR has a central disk CD that defines lug holes LH therethrough around a central opening CO. The lug holes LH are located on a lug hole circle concentrically of the effective rotational axis of the tire assembly when it is mounted on a vehicle. The back side of the central disk CD is adapted to be supported against the hub on the vehicle while the front side of the central disk CD is engaged by the lug nuts around the lug holes LH to hold the wheel rim in place against the vehicle hub. It is to be understood that different tire assemblies have different diameter lug hole circles and also different numbers of lug holes LH. Typically, tire assemblies have either four or five lug holes.

Figures 1, 2:
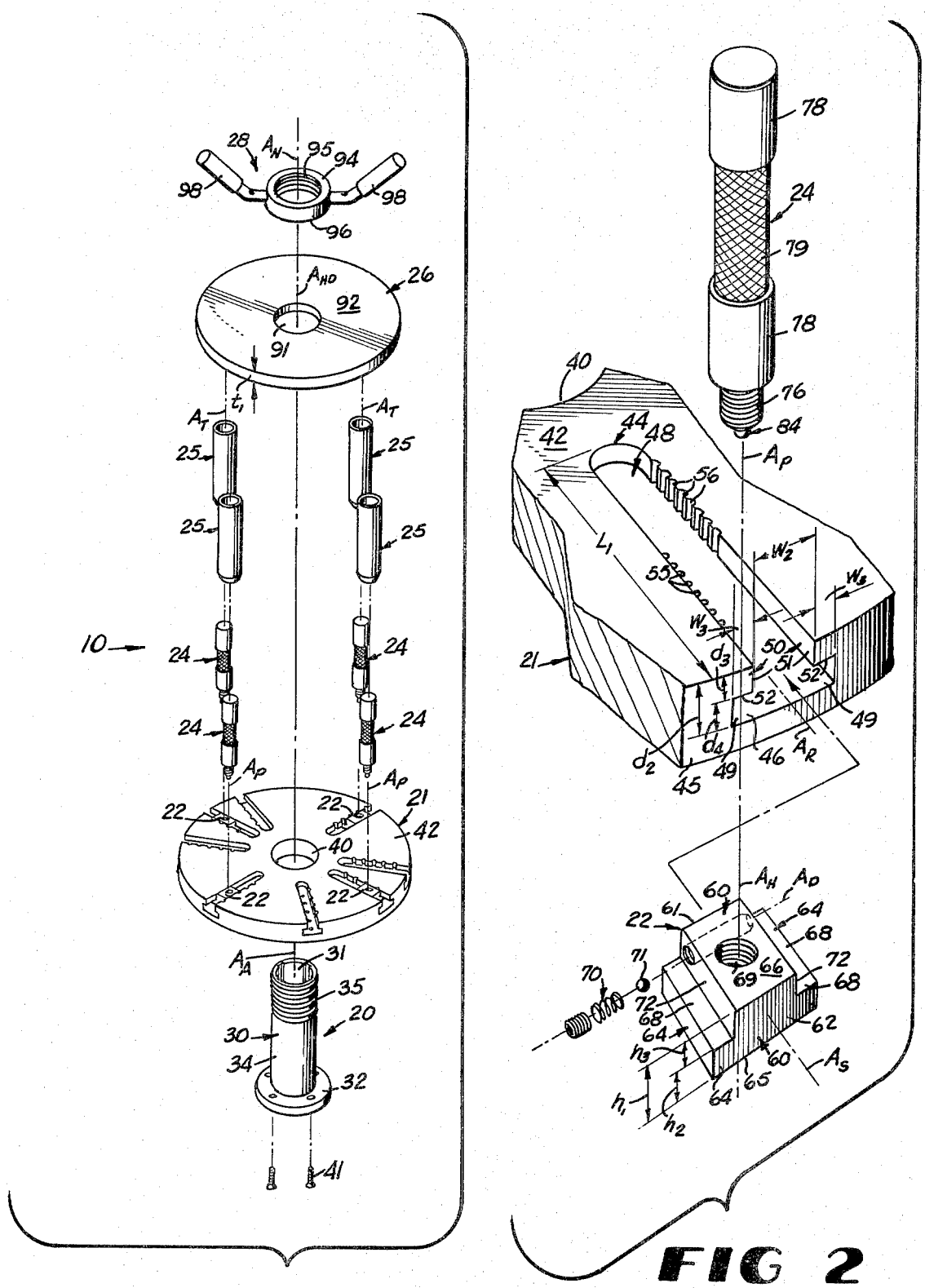
FIG. 1 is an exploded perspective view of the adapter unit of the invention.
FIG. 2 is an enlarged exploded view of the adjustment means of the adapter unit.

The system of the invention includes generally an adapter unit 10 seen in FIG. 1 used to mount the tire assembly TA thereon and a gaging unit 11 seen in FIG. 12 used to determine the setting of the adapter unit 10 for mounting the tire assembly TA thereon.

ADAPTER UNIT

Figure 16:
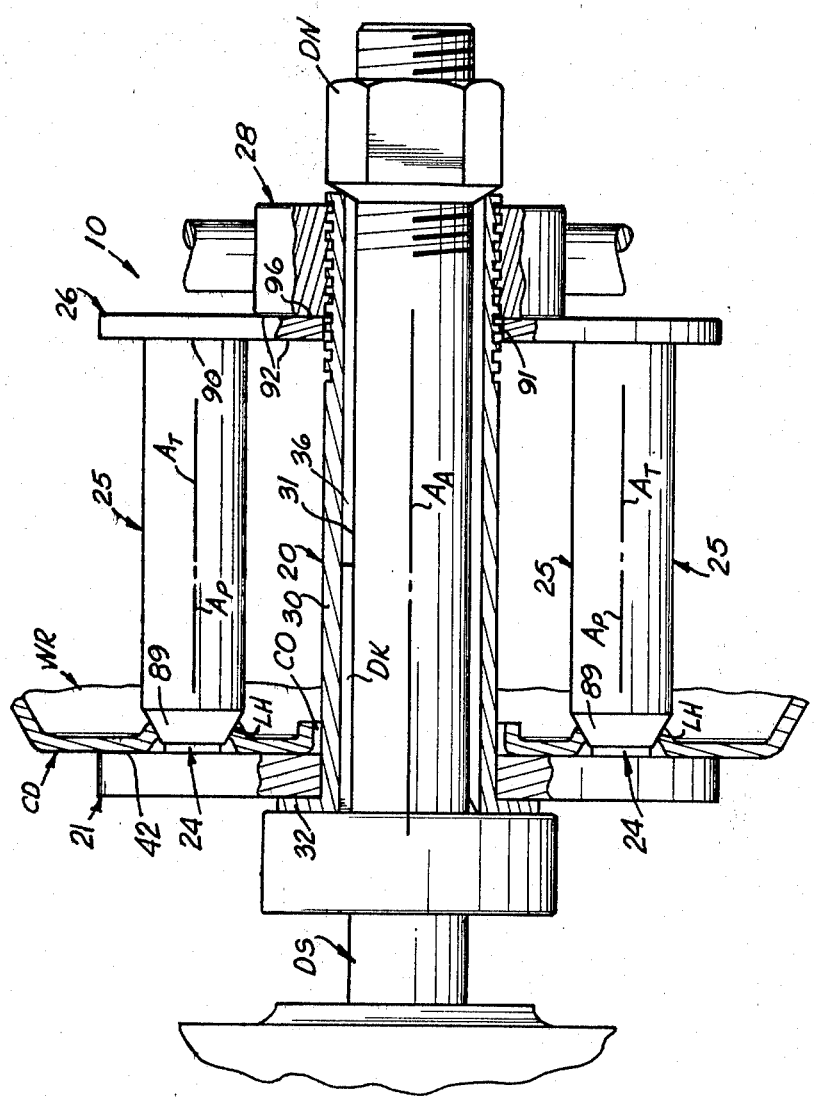
FIG. 16 is a view showing the adapter unit mounting the wheel rim on the drive spindle of a testing and correcting apparatus.

Referring more particularly to FIG. 1, it will be seen that the adapter unit 10 includes a support sleeve 20 adapted to be received on the drive spindle DS of a tire testing and/or correcting apparatus as seen in FIG. 16 such as a wheel balancer. The support sleeve 20 fixedly mounts a backing plate 21 thereon. A plurality of slide members 22 are slidably mounted on the backing plate 21 for adjustment along radially extending paths therein as will become more apparent. A plurality of locating pins 24 are mounted on the slide members 22 and adapted to project through the lug holes LH in the wheel rim WR as will become more apparent. A plurality of hold down tubes 25 are slidably received over the locating pins 24 and engage the wheel rim WR around the lug holes LH to support the wheel rim WR between the backing plate 21 and hold down tubes 25. A hold down plate 26 is mounted on the support sleeve 20 and engages the ends of all of the hold down tubes 25 in opposition to backing plate 21. A locking nut 28 engages the support sleeve 20 to force the hold down plate 26 and hold down tubes 25 toward the backing plate 21 to lock the wheel rim WR onto the adapter 10. With the tire assembly TA thusly mounted on the adapter 10, the tire assembly can be mounted on the drive spindle of the testing and/or correcting apparatus simply by slipping the adapter 10 onto the drive spindle.

The support sleeve 20 includes a tubular side wall 30 about a central axis $A_A$. The side wall 30 defines a central passage 31 therethrough concentrically of axis $A_A$ with a diameter $d_1$ substantially equal to the diameter of the drive spindle DS so that the sleeve 20 will just slidably fit over the drive spindle. An arresting flange 32 is provided on one end of the tubular side wall 30 and projects outwardly therefrom normal to the central axis $A_A$ to support the backing plate 21 as will become more apparent. The side wall 30 defines a cylindrical bearing surface 34 on the outside thereof concentrically of the axis $A_A$. That end of the side wall 30 opposite the arresting flange 32 is externally threaded with threads 35 to be threadedly engaged by the locking nut 28 as will become more apparent. The side wall 30 also defines a plurality of key slots 36 therein extending along the length thereof parallel to axis $A_A$ and opening into the passage 31. Each of the key slots 36 has a width and depth sized to receive the key on the drive spindle therein so that the key will rotationally fix the support sleeve 20 with respect to the drive spindle DS.

It will further be understood that the support sleeve 20 may be fixedly mounted on the drive spindle DS in some instances. This is within the inventive concept disclosed herein.

The backing plate 21 is a circular disk defining a central opening 40 therethrough sized so that the side wall 30 of support sleeve 20 is just slidably received therethrough to support backing plate 21 thereon. The backing plate 21 abuts the arresting flange 32 and is fixedly attached thereto by appropriate means such as the screws 41 seen in FIG. 1. The backing plate 21 defines a working face 42 thereon oriented normal to the axis $A_A$ of support sleeve 20 and facing away from the arresting flange 32 on support sleeve 20. The backing plate 21 defines a plurality of slots 44 therein which extend radially of the axis $A_A$ and open onto the working face 42. The slots 44 are arranged in two different circumferentially spaced configurations about the working face 42 so that wheel rims WR with four or five lug holes LH can be alternatively mounted thereon. One of the slots labelled $44_c$ in FIG. 3 is common to both circumferential spaced configurations. Slot $44_c$ can be used with the slots labelled $44_a$ to mount a wheel rim WR with four lug holes LH while slot $44_c$ can be used with the slots $44_b$ to mount a wheel rim WR with five lug holes LH. Thus, it will be seen that slots $44_a$ and $44_c$ are circumferentially spaced 90° apart while slots $44_b$ and $44_c$ are circumferentially spaced 72° apart.

Slots 44 have a common configuration and with each extending radially inwardly from the outer circular edge 45 of backing plate 21 along an axis $A_R$ oriented normal to and radially of the axis $A_A$. Each slot 44 has a length $L_1$ as seen in FIG. 2 and an inverted T-shaped cross-sectional shape. Slot 44 extends into the backing plate a depth $d_2$ with the bottom surface 46 of slot 44 oriented parallel to the working face 42 on backing plate 21 and spaced the distance $d_2$ therefrom. The central section 48 of slot 44 opens onto the working surface 42 and has a width $W_2$. Slot 44 has a pair of side sections 49 along opposite sides of the central section 48 defined between a lip 50 extending along opposite sides of the central section 48 of slot 44 and the bottom surface 46 of slot 44. The inboard face 51 on each of the lips 50 defines one side of the central section of slot 44 while the undersurface 52 of each of the lips 50 defines that side of side section 49 opposite bottom surface 46. The undersurfaces 52 of the opposed lips 50 are co-planar and spaced from the working face 42 the distance $d_3$ so that the plane of undersurfaces 52 is parallel to the working face 42. The side sections 49 project out from the central section 48 the distance $W_3$ with each side section having a depth $d_4$.

A plurality of locating depressions 55 are formed in the backing plate 21 in the bottom of slot 44 and open onto the bottom surface 46 of slot 44. The locating depressions 55 are centered on the slot axis $A_R$ and axially spaced therealong. The depressions 55 are located at different radial distances from the central axis $A_A$ of the backing plate 21 with the radial distance of each corresponding to the radius of a different lug hole circle typically found in wheel rims. For instance, eight locating depressions 55 are illustrated for slot $44_b$ seen in FIG. 9 and have been referenced $55_1$-$55_8$. The different radial distances have been correspondingly labelled $R_1$-$R_8$ in FIG. 9. As will become more apparent, the depressions 55 serve to positively locate each of the locating pins 24 at the desired radial distance from the adapter axis $A_A$ for the different size lug hole circles in the wheel rim.

Figure 9:
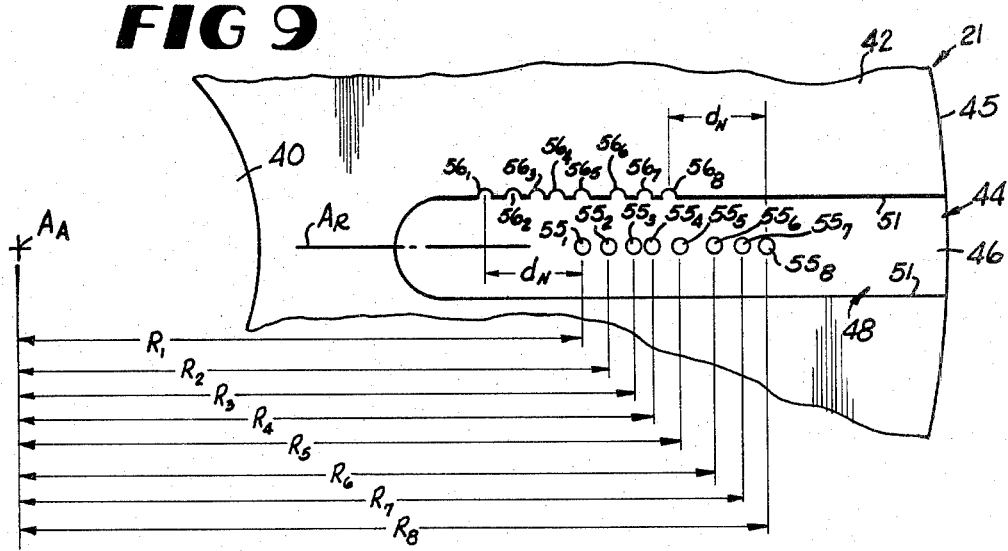
FIG. 9 is an enlarged partial face view of one of the adjustment slots of the adapter unit.

A plurality of notches 56 are formed in the inboard face 51 of one of the lips 50 at each slot 44. The notches 56 extend across the face 51 normal to the working face 42 of backing plate 21 and correspond in number to the locating depressions 55. Each notch 56 is associated with one of the locating depressions 55 and is spaced the common radial distance $d_n$ inboard of its associated locating depression 55. For clarity, the notches have been labelled $56_1$-$56_8$ for correspondence with the associated locating depression $55_1$-$55_8$ in FIG. 9. As will become more apparent, the notches 56 are used to preliminarily locate the slide member 22 axially of slot 44 so as to operatively associate the locating pin 24 with the associated locating depression 55 when the locating pin 24 is installed in slide member 22. Each of the notches 56 is provided with appropriate identifying indicia 58 so that the slide members 22 in the different slots 44 can be located at the same radial spacing from the central axis $A_A$. As best seen in FIGS. 3 and 9, the notches 56 have been labelled 1-8 for each of the slots 44 for this correlation.

A sufficient number of side members 22 is provided for use with both sets of slots 44. For instance, four are required when slots $44_c$ and $44_a$ are used while five are required when slots $44_c$ and $44_b$ are used. All of the slide members 22 have a common construction and therefore only one will be described in detail.

Slide member 22 is an elongate member with a longitudinal axis $A_S$ and an inverted T-shaped cross-section complementary to that of slot 44 so that slide member 22 is slidably received in slot 44. Slide member 22 has a central section 60 extending from its inboard end 61 to its outboard end 62 of height $h_1$ and width $w_4$ as best seen in FIGS. 2 and 6. Height $h_1$ is about equal to depth $d_2$ of slot 44 and width $w_4$ is about equal to width $w_2$ of the central section 48 of slot 44. Slide member 22 also has a pair of side sections 64 extending along the length of the central section 60 on opposite sides thereof so that the side sections 64 and central section 60 have a common bottom surface 65 parallel to slide axis $A_S$. Thus, the central section 60 has an upper surface 66 parallel to bottom surface 65 and spaced therefrom the distance $h_1$. Each of the side sections 64 extends upwardly from the bottom surface 65 a height $h_2$ to define an upper surface 68 thereon parallel to the lower and upper surfaces 65 and 66 and spaced below the upper surface 66 the distance $h_3$. The distance $h_3$ is substantially equal to the distance $d_3$ while the height $h_2$ is substantially equal to the depth $d_4$ of the side sections 49 of slot 44. The side sections 64 on the slide member 22 project laterally outwardly of the central section 60 for a distance $w_5$ substantially equal to the distance $w_3$ of the side sections 49 in slot 44 so that the slide member 22 can be slidably inserted in slot 44 with the central section 60 of slide member 22 in the central section 48 of slot 44 and side sections 64 on slide member 22 in side sections 49 in slot 44. This locates the slide axis $A_S$ substantially in registration with the radial axis $A_R$ of slot 44. When the slide member 22 is forced upwardly away from the bottom surface 46 of slot 44, the upper surfaces 68 on the side sections 64 on slide member 22 engage the undersurfaces 52 on lips 50 to positively locate the upper surface 66 on slide member 22 generally coplanar with the working face 42 on backing plate 21.

The central section 60 of slide member 22 defines a threaded hole 69 therethrough about axis $A_H$ intersecting the slide axis $A_S$ and normal to both slide axis $A_S$ and the working face 42 on backing plate 21. Thus, the hole axis $A_H$ is parallel to the adapter axis $A_A$ when the slide member 22 is in slot 44. The locating pins 24 are mounted in holes 69 as will become more apparent.

To locate the slide member 22 axially along the slot 44, a detent assembly 70 is mounted in the central section 60 of slide member 22 about a detent axis $A_D$ perpendicular to both axes $A_s$ and $A_H$. The detent assembly 70 includes a spring urged detent ball 71 which projects outwardly from that side surface 72 on the central section 60 of slide member 22 in juxtaposition with the inboard face 51 on lip 50 in which notches 56 are located. Thus, as the slide member 22 is forced along slot 44 with its inboard end 61 facing inwardly toward the center of plate 21, the detent ball 71 will engage the notches 56 to positively locate the slide member 22 with respect to the notches 56, yet permit the slide member 22 to be moved from notch to notch. An arrow 74 is provided on the upper surface 66 of the slide member 22 in registration with detent ball 71 so that the operator can tell in which notch 56 the detent ball 71 is located. The detent axis $A_D$ is located the same distance $d_N$ from the hole axis $A_H$ as each notch 56 is located from its associated locating depression 55 in slot 44. This locates the slide member 22 so that the hole axis $A_H$ in slide member 22 is in registration with the depression 55 associated with the particular notch 56 engaged by the detent ball 71 as will become more apparent.

One of the locating pins 24 is used in each slide member 22. All of the locating pins 24 have a common construction so only one will be described in detail.

Locating pin 24 is best seen in FIGS. 7 and 8. Pin 24 has a central axis $A_P$, a main body 75 and an externally threaded attachment section 76 on one end of body 75. The main body 75 has cylindrical locating sections 78 at opposite ends thereof joined by a knurled gripping section 79 extending therebetween. Each of the locating sections 78 defines a cylindrical outside locating surface 80 thereon concentrically of axis $A_P$ with diameter $d_5$. The locating surfaces 80 serve to locate the hold down tubes 25 as will become more apparent. The knurled section 79 is also cylindrical with an outside diameter smaller than that of the locating sections 78 so as not to interfere with the operation of the locating surfaces 80. The knurled section 79 is adapted to be manually grasped to operate the locating pin as will become more apparent. The main body 75 has a length $L_3$ of about two inches.

Figure 10:
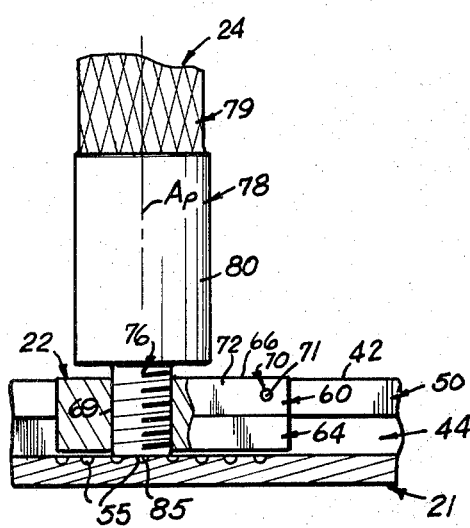
FIG. 10 is an enlarged view illustrating the adjustment means of the adapter unit.

The attachment section 76 is integral with that end of one of the locating sections 78 opposite the gripping section 79. The attachment section 76 is centered on the pin axis $A_P$ and is externally threaded and sized so that the attachment section 76 can be screwed into the threaded hole 69 in the slide member 22. The attachment section 76 has a length $L_4$ greater than the height $h_1$ of the central section 60 of the slide member 22 as will become more apparent. The projecting end 81 of the attachment section 76 is oriented generally normal to the pin axis $A_P$ so that, when the attachment section 76 is screwed into the hole 69 in the slide member 22, the projecting end 81 will engage the bottom surface 65 in slot 44 before the end surface 82 on the locating section 78 engages the upper surface 66 on the central section 60 of slide member 22 as best seen in FIG. 10.

A detent assembly 84 is mounted in the attachment section 76 as best seen in FIG. 8 so that the spring urged ball detent 85 thereof projects out of the projecting end 81 of the attachment section 76. The ball detent 85 is located in registration with the pin axis $A_P$. Thus, when the detent ball 71 in slide member 22 is engaging one of the notches 56 along slot 44, the ball detent 85 on the locating pin 24 will be substantially in registration with the depression 55 associated with the notch 56 engaged by detent ball 71. Thus, as the attachment section 76 is screwed into the hole 69 in slide member 22, the ball detent 85 will engage depression 55 to shift the slide member 22 and locating pin 24 until the ball detent 85 is in precise registration with depression 55. This compensates for any loose motion between the slot 44 and slide member 22 required for slide member 22 to be moved along slot 44 to insure that the pin axis $A_P$ is in precise registration with the depression 55. Also, the attachment section 76 on locating pin 24 forces the upper surfaces 66 on the side sections 64 of slide member 22 into engagement with the undersurfaces 52 on lips 50 on opposite sides of slot 44 when the attachment section 76 on the locating pin 24 bears against the bottom surface 46 of slot 44. This serves to precisely locate the axis $A_p$ of pin 24 normal to the working face 42 of backing plate 21 and parallel to the adapter axis $A_A$ and with axis $A_A$ at the desired radius R corresponding to that of the lug hole circle in the wheel rim to be mounted.

A hold down tube 25 is provided for each of the locating pins 24. The hold down tubes 25 serve to both orient the wheel rim WR so that the lug hole circle is concentrically of the adapter axis $A_A$ and to hold the wheel rim against the backing plate 21. All of the hold down tubes 25 have a common construction and only one will be described in detail.

Figure 11:
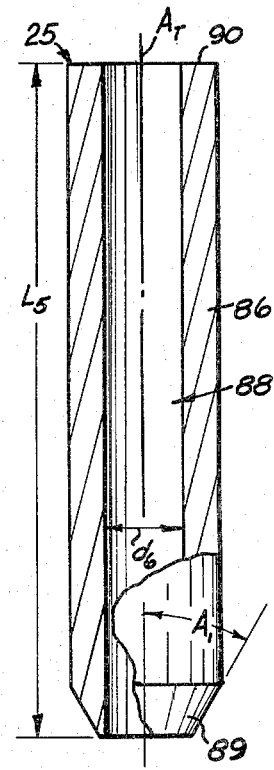
FIG. 11 is an enlarged longitudinal cross-sectional view of the hold down tube of the adapter unit.

As seen in FIG. 11, the hold down tube 25 has a length $L_5$ greater than that of the main body 75 of locating pin 24 and is illustrated at about four and one-half inches. The hold down tube 25 has a tubular side wall 86 defining a central locating passage 88 therethrough about the tube central axis $A_T$. The central passage 88 has a constant diameter $d_6$ along its length which is just sufficient for the locating pin 24 to be slidably received through passage 88 with the locating surfaces 80 on the locating sections 78 of pin 24 engaging the tube side wall 86 to locate the tube axis $A_T$ in registration with the pin axis $A_p$.

The side wall 86 defines a tapered hole engaging surface 89 thereon which tapers with an included angle $A_1$ with the central axis $A_T$ of about thirty degrees. The surface 89 is adapted to engage the complementary tapered surface of the lug hole LH in the wheel rim WR so that, when the tapered surface 89 is forced into the lug hole LH, the surface 89 will locate the lug hole LH concentrically of the tube axis $A_T$.

The opposite end of the side wall 86 is provided with a driving surface 90 oriented normal to the tube axis $A_T$. The driving surface 90 is adapted to be engaged by the hold down plate 26 to force the tapered surface 89 on the opposite end of tube 25 into the lug hole LH on the wheel rim WR.

The hold down plate 26 seen in FIG. 1 is circular with an outside diameter about equal to that of the backing plate 21 and defines a mounting hole 91 through the center thereof with a diameter substantially equal to the diameter of the outside bearing surface 24 on the support sleeve 20. This permits the side wall 30 of support sleeve 20 to slidably pass through hole 91 to mount plate 26 on support sleeve 20.

The hold down plate 26 has a thickness $t_1$ and defines working faces 92 on opposite sides thereof. The faces 92 are oriented normal to the axis $A_{HD}$ of hole 91 and parallel to each other. The diameter of the faces 92 is such that, when the hold down plate 26 is placed over the threaded end of the support sleeve 20 after the hold down tubes 25 have been placed over the locating pins 24, one of the faces 92 will engage the driving surfaces 90 on all of the hold down tubes 25 regardless of the particular radial position from the adapter axis $A_A$ at which the hold down tubes 25 are located.

The locking nut 28 also seen in FIG. 1 includes an annular nut ring 94 defining an internally threaded hole therethrough with threads 95 adapted to threadedly engage the threads 35 on the support sleeve 20 so that nut 28 can be screwed thereon. The nut ring 94 defines a driving face 96 thereon oriented normal to the nut axis $A_N$. The driving face 96 is adapted to face the hold down plate 26 when nut 28 is screwed onto the support sleeve 20 and engages that working face 92 on hold down plate 26 opposite the hold down tubes 25 to cause the hold down tubes 25 to be equally urged to ward the backing plate 21 as nut 28 is tightened.

The nut 28 also includes a plurality of drive handles 98 mounted on the nut ring 94 and projecting outwardly therefrom. The handles 98 are adapted to be manually gripped to tighten the nut 28 onto the support sleeve 20 as will become more apparent.

GAGING UNIT

Figure 13:
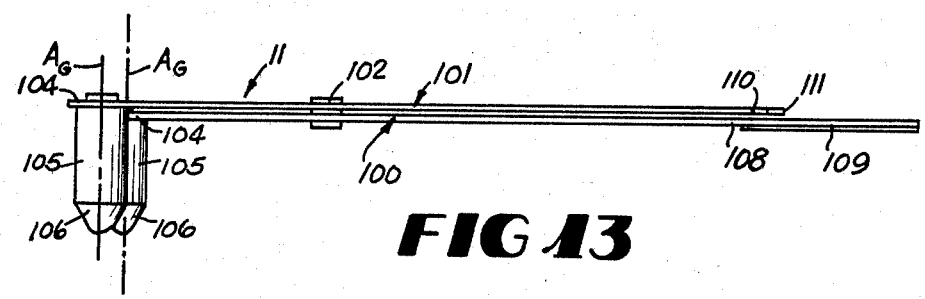
FIG. 13 is an enlarged side elevational view of the gaging unit of the invention.

Referring to FIGS. 12 and 13, it will be seen that the gaging unit 11 is used to correlate the lug hold circle size in the wheel rim WR to a setting for the slide members 22 in slots 44 of the adapter 10. This allows the locating pins 24 to be prelocated for receipt of the wheel rim WR thereon.

The gaging unit 11 includes a pair of elongate arms 100 and 101 pivoted together with pivot pin 102 intermediate their ends. Both arms 100 and 101 have an input end 104 which mounts a measuring pin 105 thereon. The measuring pins 105 project outwardly from arms 100 and 101 in the same direction and are oriented normal to the plane of the arms so that the axes $A_G$ of pins 105 are parallel. Thus, as the arms 100 and 101 are pivoted about pivot pin 102, the distance $D_G$ between the pin axes $A_G$ is varied. The projecting end 106 of each of the measuring pins 105 is tapered complementarily to the lug holes LH so that, when the gaging unit 11 is placed on the front side of the wheel rim WR as seen in FIG. 12, the projecting end 106 of one of the measuring pins 105 can be located in one of the lug holes LH and the arms 100 and 101 pivoted with respect to each other until the projecting end 106 of the other measuring pin 105 is located in the next adjacent lug hole LH to that in which the other pin 105 is located. The pins 105 are pressed into the lug holes LH to cause the taper on the projecting ends 106 thereof to fit the taper on the lug holes. This causes the axes $A_G$ of pins 105 to be spaced apart the same distance as that of the lug holes LH.

The output end 108 of arm 100 mounts a scale plate 109 thereon projecting laterally outwardly therefrom so as to underlie the projecting end 110 of the arm 101. The projecting end 110 of arm 101 is pointed to form an indicating point 111 thereon that is moved over scale plate 109 as the arms 100 and 101 are pivoted with respect to each other. The scale plate 109 is provided with a scale 112 underlying the point 111 and appropriate indicia 114 is provided on scale 112 to relate the indication on scale 112 by point 111 to the indicia 58 on backing plate 21 associated with notches 56. The arms 100 and 101 are sized so that when the slide members 22 are adjusted in slots 44 so that the arrow 74 on each is aligned with the notch 56 having the same designation as that indicated on scale 112 and the locating pin 24 tightened in the slide member 22, the axis $A_P$ of locating pin 24 will be located from the adapter axis $A_A$ the same radial distance that the lug holes LH are located from the effective axis of rotation of the wheel rim WR when the tire assembly TA is mounted on the vehicle. For instance, the gaging unit 10 shows the point 111 on arm 101 indicating position "3" on scale 112 with the wheel rim WR having five lug holes LH. Five slide members 22 would be positioned in the common slot $44_c$ and slots $44_b$ for this mounting and each slide member 22 would be adjusted until the arrow 74 thereon is aligned with the notch $56_3$ at position "3" in the indicia 58. When the locating pins 24 are tightened, the pins 24 would be located on the same diameter circle as that of the lug holes LH in wheel rim WR.

It is possible for the gaging unit 11 to indicate the radial distance between the lug holes LH and the rotational axis of the tire assembly TA by measuring the distance between adjacent lug holes LH since there is a known mathmatical relationship between these two dimensions. This facilitates the measuring operation since the distance between adjacent lug holes LH is more easily measured directly than the radial distance that the lug hole LH is located from the effective rotational axis of the tire assembly.

It will also be appreciated that scale 112 is designed for wheel rims WR having five lug holes. A different scale would be used for wheel rims WR having four lug holes. This may be provided by providing this different scale on an overlay member adapted to fit on the scale plate 109 or, alternately, a separate gaging unit may be provided with this different scale. The gaging unit 10 is provided with a marking 115 to indicate that it is to be used with wheel rims having five lug holes and similar markings would be provided for the gaging unit to be used with wheel rims having four lug holes.

OPERATION

When a tire assembly TA is to be mounted on the drive spindle of a testing and correcting apparatus using the adapter unit 10, the appropriate gaging unit 11 is selected for measuring the particular number of lug holes in the wheel rim of that tire assembly. As seen in FIG. 12, the gaging unit 11 is positioned on the tire assembly TA and is adjusted so that the tapered projecting ends 106 on the measuring pins 105 fit in adjacent lug holes on the wheel rim. The indicated position on the scale 112 of the gaging unit 11 is noted. After this, the gaging unit 11 can be laid aside and the mounting unit 10 readjusted for mounting the wheel rim WR thereon.

The operator then takes the adapter unit 10 with the hold down tubes 25, hold down plate 26 and nut 28 removed so that the locating pins 24 can be adjusted. The operator checks to make sure that the slide members 22 are located either in slots $44_a$ or $44_b$ so that the same number of slide members 22 are used as there are lug holes in the wheel rim. With the locating pins 24 partly screwed into the holes 69 in the slide members 22, the operator then adjusts each of the slide members 22 until the arrow 74 thereon is aligned with the notch 56 having the same indicated position as that noted on scale 112 of the gaging unit 11. Thus, the locating pins 24 will all be spaced from the central axis $A_A$ of the adapter the same distance that the lug holes LH are spaced from the effective axis of rotation of the wheel rim WR. With the slide members 22 in this position, the operator then tightens the locating pins 24 into the hole 69 so that the detent assembly 84 on the end of the threaded attachment section of the locating pin 24 fits into the depression 55 thereunder to center the locating pin 24 on the radial axis $A_R$ of the slot 44. This locks both the slide member 22 and the locating pin 24 in position so that the pin axis $A_P$ is centered on the slot axis $A_R$ and the pin axis $A_P$ is parallel to the adapter axis $A_A$.

Figure 14:
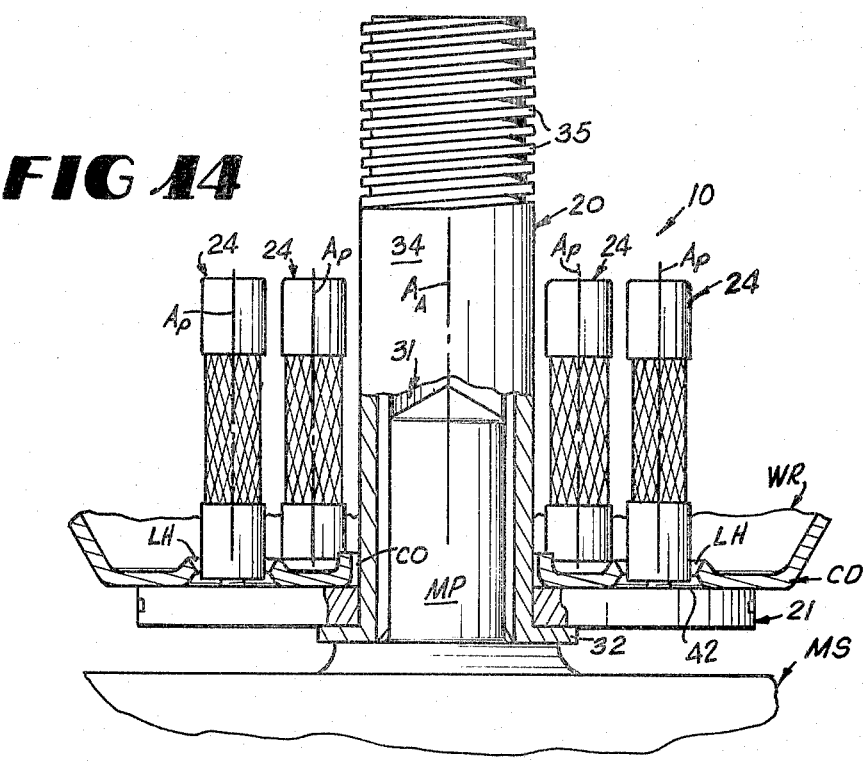
FIG. 14 is a view illustrating a wheel rim being initially placed on the adapter unit.

The operator then places the thusly adjusted adapter unit 10 onto a mounting stand MS partly seen in FIG. 14 so that the mounting pin MP extends up into the central passage 31 through the support sleeve 20 and the arresting flange 32 on the support sleeve 20 rests on the mounting stand MS around the mounting pin MP. This positions the adapter unit 10 so that the central axis $A_A$ thereof is generally vertically oriented and the locating pins 24 project upwardly from the backing plate 21. The mounting adapter 10 as seen in FIG. 14 is adjusted for a wheel rim with five lug holes therein with one of the locating pins 24 omitted to show the mounting pin MP extending into the support sleeve 20.

With the mounting adapter 10 in this position, the operator simply picks up the tire assembly TA and positions the wheel rim so that the central opening CO therethrough passes around the support sleeve 20 with the back side of the central disc CD facing the working face 42 of the backing plate 21. The workman appropriately rotates the wheel rim WR until the lug holes LH therethrough align with the mounting pins 24 and lowers the wheel rim WR onto the backing plate 21 with the locating pins 24 passing upwardly through the lug holes LH. Because the operator only has to align the lug holes LH with the pre-positioned locating pins 24, this initial positioning of the wheel rim on the adapter unit 10 is greatly facilitated.

Figure 15:
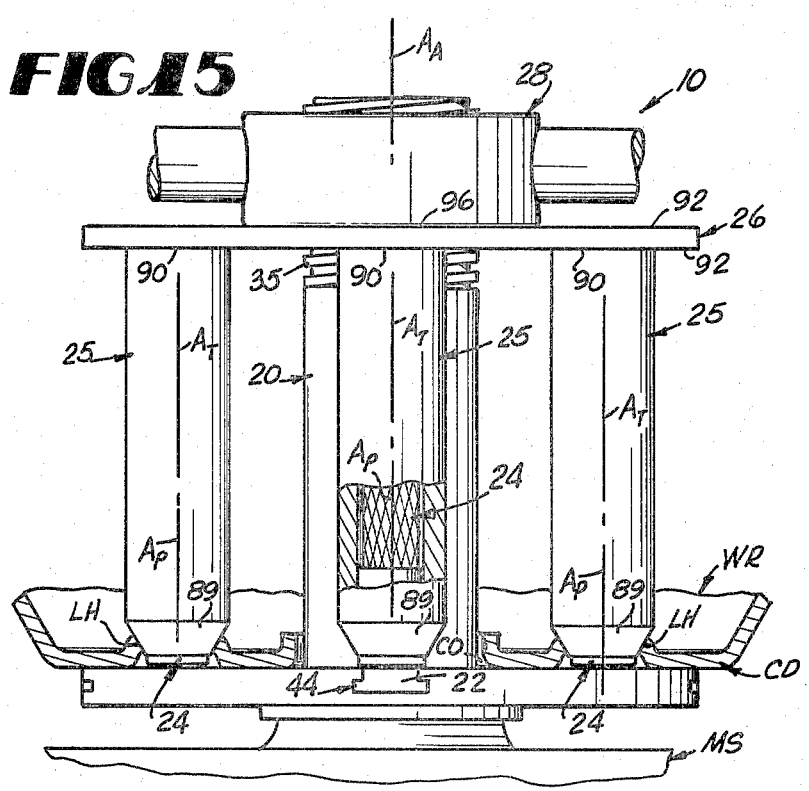
FIG. 15 is a view similar to FIG. 14 after the wheel rim has been mounted on the adapter unit.

After the workman has placed the wheel rim onto the adapter 10 as seen in FIG. 14, he then slides the hold down tubes 25 over the locating pins 24 so that the tapered surface 89 faces the backing plate 21. This causes the tapered surfaces 89 on the hold down tubes 25 to engage the lug holes LH around the locating pins 24. The operator then places the hold down plate 26 onto the adapter 10 with the threaded end of the support sleeve 20 passing through the mounting hole 91 in the hold down plate 28. This places the working face 92 on that side of the hold down plate 26 in engagement with the driving surfaces 90 on the upper ends of each of the hold down tubes 25. The operator then screws the locking nut 28 onto the threads 35 on the upper end of the support sleeve 20 so that the driving face 96 on the locking nut 28 engages the working face 92 on the hold down plate 26 in opposition to the hold down tubes 25 so that the hold down plate 26 forces all of the hold down tubes 25 downwardly until the tapered holding gaging surfaces 89 on the ends of the hold down tubes 25 seat in the lug holes LH as seen in FIG. 15. This locates each of the lug holes LH concentrically of the axis $A_p$ of the pins 24 so that the lug hole circle is concentric of that axis $A_A$ of the adapter unit 10. The tire assembly and adapter unit 10 is now ready for mounting on the drive spindle of the testing and correcting apparatus.

The operator then simply lifts the tire assembly TA with the adapter unit 10 mounted thereon from the mounting stand MS and slips the support sleeve 20 over the drive spindle DS of the testing and correcting apparatus as seen in FIG. 16. When the mounting adapter is placed on the drive spindle DS, the tire assembly TA and mounting adapter 10 are rotated as a unit until the drive key DK on spindle DS is aligned with one of the key slots 36 in the support sleeve 20. The operator then slides the adapter unit 10 along the drive spindle DS until it is properly seated on drive spindle DS. Because the drive spindle diameter matches the diameter of the passage 31 through the support sleeve 20, the adapter unit 10 is located so that the adapter axis $A_A$ coincides with the axis of the drive spindle. Thus, the tire assembly TA is supported so that its effective axis of rotation coincides with the axis of the drive spindle. The drive key DS on spindle DS engages the adapter unit 10 in one of the key slots 36 to positively rotate the adapter unit 10 and thus the tire assembly therewith.

Some drive spindles DS may be threaded on their projecting end as seen in FIG. 16 and a mounting nut DN provided to screw onto spindle DS and engage the adapter unit 10 to keep it in place on the drive spindle DS. This construction is typical for wheel balancers.

What is claimed as invention is:

1. A system for mounting the wheel rim of a tire assembly on the drive spindle of a tire correction machine including an adapter unit comprising:

a base assembly defining a central passage therethrough mounting said base assembly on the drive spindle, said base assembly defining an abutment surface thereon oriented normal to the central axis of said central passage and defining a plurality of radially extending slots therein equally spaced from each other circumferentially about the central axis of said base assembly, said slots corresponding in number to the lug holes in the wheel rim, a plurality of elongate locating pins corresponding in number to the lug holes through the wheel rim, each of said locating pins including an externally threaded attachment section on one end thereof;

a plurality of slide members, one of said slide members slidably mounted in each of said slots for movement therealong, each of said slide members defining an internally threaded hole therethrough oriented parallel to said central axis of said base assembly, said hole adapted to threadedly receive said attachment section on said locating pin therein so that said attachment section will bear against said base assembly to selectively lock said slide member in said slot at selected positions along said slot;

a plurality of hold down tubes corresponding in number to said locating pins, each of said hold down tubes defining a tube passage therethrough sized to slidably receive one of said locating pins therein to locate said hold down tube coaxial with said locating pin, each of said hold down tubes defining a tapered locating surface on one end thereof adapted to engage the wheel rim around the lug hole through which said locating pin projects to locate the lug hole concentrically of said locating pin when the wheel is positioned between said hold down tube and said abutment surface;

a hold down member adapted to be positioned on said base assembly and engaging those ends of said hold down tubes opposite said tapered locating surfaces thereon; and a locking member threadedly engaging said base assembly to force said hold down member and said hold down tubes towards said abutment surface so that the wheel rim is captivated between said hold down tubes and said abutment surface to locate the wheel rim with the lug hole circle thereof concentric of said central axis of said base assembly.

2. The system of claim 1 wherein said adapter unit further includes indicator means for indicating the radial distance between each of said locating pins and said central axis so that all of said locating pins can be located equidistant from said central axis, said system further including gaging means independent of said adapter unit for measuring the distance between adjacent lug holes in the wheel rim, said gaging means including readout means for indicating the radial distance between the lug holes on the wheel rim and the effective axis of rotation of the tire assembly so that said adapter unit can be preadjusted to mount the wheel rim by manipulation of said adjustment means until said indicator means shows that said locating pins are spaced the same radial distance from said central axis of said adapter unit as said readout means on said gaging unit indicates the lug holes are located from the effective axis of rotation of the tire assembly.

3. The system of claim 1 further including locating means for selectively locating each of said slide members at predetermined positions along the length of said slot mounting said slide member so as to locate said locating pin mounted on said slide member at predetermined radial distances from said central axis of said base assembly.

4. The system of claim 3 wherein said locating means includes a plurality of sets of notches defined in said base assembly along said slots, with one of said sets of notches along each of said slots, said notches of each of said sets located at different predetermined radial distances from said central axis of said base assembly and each of said notches in each set located at the same predetermined radial distance from said central axis as one of said notches in each of said other sets; and slide detent means mounted on each of said slide members resiliently engaging said notches in said set along said slot slidably carrying said slide member to locate said slide member at predetermined positions along said slot so that, when said slide detent means in each of said slide members engages the corresponding notch in each of said sets of notches, all of said locating pins will be located equidistant from said central axis of said base assembly.

5. The system of claim 4 wherein said attachment section on each of said locating pins has a projecting end thereon adapted to bear against said base assembly at said slot, wherein said base assembly defines a plurality of sets of depressions therein opening into said slots with one of said sets of depressions along each of said slots and with each of said depressions in each of said sets located in registration with said radial path along said slot, said depressions in each set corresponding in number to the number of notches in said set of notches along said slot with each of said depressions located a common prescribed radial distance from a different one of said notches equal to the distance between said detent means and the hole axis in said slide member; and wherein said locating pin includes pin detent means centrally located on the projecting end of said attachment section in registration with the axis of said locating pin so that, when said attachment section on said locating pin is screwed into said hole through said slide member, said pin detent means will engage said depression in said base assembly in registration with said hole in said slide member to locate the axis of said locating pin in registration with said radial path along said slot.

6. The system of claim 4 further including adjustment indicia associated with said notches in each of said sets of notches where the adjustment indicia associated with each of said notches in each of said sets is common to the adjustment indicia associated with the corresponding of said notches in each of said other sets located at the same predetermined radial distance from said central axis of said base assembly as said firse mentioned notch.

7. The system of claim 6 further including gaging means for measuring the distance between adjacent lug holes in the wheel rim, said gaging means including readout means for indicating the radial distance between the lug holes in the wheel rim and the effective axis of rotation of the tire assembly, said readout means having measuring indicia thereon corresponding to the adjustment indicia on said adapter unit so that, by moving said slide members until said slide detent means engages that one of said notches having the same adjustment indicia as the measuring indicia indicated on said gaging unit, said locating pins will be located the same radial distance from said central axis of said base assembly as the lug holes are spaced from the effective axis of rotation of the tire assembly whereby the effective axis of rotation of the tire assembly will coincide with the central axis of said base assembly when the tire assembly is mounted on said adapter unit.

8. The system of claim 1 wherein said attachment section on each of said locating pins has a projecting end thereon adapted to bear against said base assembly at said slot, wherein said base assembly defines a plurality of sets of depressions therein opening into said slots with one of said sets of depressions along each of said slots and with each of said depressions in each of said sets located in registration with said radial path along said slot, said depressions in each set corresponding in number to the number of notches in said set of notches along said slot with each of said depressions located a common prescribed radial distance from a different one of said notches equal to the distance between said detent means and the hole axis in said slide member; and wherein said locating pin includes pin detent means centrally located on the projecting end of said attachment section in registration with the axis of said locating pin so that, when said attachment section on said locating pin is screwed into said hole through said slide member, said pin detent means will engage said depression in said base assembly in registration with said hole in said slide member to locate the axis of said locating pin in registration with said radial path along said slot.

* * * * *